United States Patent
Mizusaki et al.

(10) Patent No.: US 8,822,401 B2
(45) Date of Patent: Sep. 2, 2014

(54) WATER-SOLUBLE SURFACTANT COMPOSITION, INK FORMULATION AND PAPER COATING FORMULATION

(71) Applicant: Nissin Chemical Industry Co., Ltd., Echizen (JP)

(72) Inventors: Toru Mizusaki, Echizen (JP); Ichiro Tanii, Echizen (JP)

(73) Assignee: Nissin Chemical Industry Co., Ltd., Fukui-ken (JP)

( * ) Notice: Subject to any disclaimer, the term of this patent is extended or adjusted under 35 U.S.C. 154(b) by 0 days.

(21) Appl. No.: 14/084,833

(22) Filed: Nov. 20, 2013

(65) Prior Publication Data
US 2014/0150690 A1   Jun. 5, 2014

(51) Int. Cl.
| | | |
|---|---|---|
| *C11D 1/72* | (2006.01) | |
| *C11D 1/722* | (2006.01) | |
| *C11D 1/825* | (2006.01) | |
| *C09D 171/02* | (2006.01) | |
| *C08L 71/02* | (2006.01) | |
| *C08G 65/22* | (2006.01) | |
| *C08K 5/06* | (2006.01) | |
| *D21H 21/12* | (2006.01) | |
| *B05D 5/00* | (2006.01) | |
| *B01D 19/04* | (2006.01) | |
| *C09D 7/12* | (2006.01) | |
| *C08G 65/26* | (2006.01) | |
| *D21H 19/60* | (2006.01) | |
| *D21H 21/24* | (2006.01) | |
| *D21H 21/22* | (2006.01) | |

(52) U.S. Cl.
CPC ............ *C09D 7/1233* (2013.01); *C09D 171/02* (2013.01); *C08G 65/22* (2013.01); *C08K 5/06* (2013.01); *D21H 21/12* (2013.01); *B05D 5/00* (2013.01); *C11D 1/722* (2013.01); *B01D 19/04* (2013.01); *C08G 65/26* (2013.01); *D21H 19/60* (2013.01); *C11D 1/72* (2013.01); *D21H 21/24* (2013.01); *D21H 21/22* (2013.01)
USPC ........... 510/421; 510/475; 510/506; 510/535; 568/616; 568/623; 568/624; 106/287.23; 427/384

(58) Field of Classification Search
USPC .......... 510/421, 475, 506, 535; 568/616, 623, 568/624; 106/287.23; 427/384
See application file for complete search history.

(56) References Cited

U.S. PATENT DOCUMENTS 6,717,019 B2 * 4/2004 Lassila .......................... 568/616

FOREIGN PATENT DOCUMENTS

| EP | 1333048 A1 | 8/2003 | |
|---|---|---|---|
| JP | 2002-348500 A | 12/2002 | |
| JP | 2003-80839 A | 3/2003 | |
| JP | 2003-113397 | * 4/2003 | ............... C11D 3/37 |
| JP | 2003-113397 A | 4/2003 | |
| JP | 2003-238472 A | 8/2003 | |
| JP | 2003-253599 A | 9/2003 | |

OTHER PUBLICATIONS

Extended European Search Report dated Apr. 1, 2014, issued in corresponding European Patent Application No. 13195623.7 (6 pages).

* cited by examiner

*Primary Examiner* — Brian P Mruk
(74) *Attorney, Agent, or Firm* — Westerman, Hattori, Daniels & Adrian, LLP

(57) ABSTRACT

A water-soluble surfactant composition is provided comprising (A) a glycidyl ether-capped acetylenic diol ethoxylate and (B) a polyoxyalkylene alkyl ether having an HLB of 8-18. When compounded in inks and paper coatings, the surfactant composition exerts improved foam controlling, dispersing, wetting and penetrating capabilities, is water soluble, and complies with high-speed printing and application conditions.

6 Claims, No Drawings

WATER-SOLUBLE SURFACTANT COMPOSITION, INK FORMULATION AND PAPER COATING FORMULATION

CROSS-REFERENCE TO RELATED APPLICATION

This non-provisional application claims priority under 35 U.S.C. §119(a) on Patent Application No. 2012-264967 filed in Japan on Dec. 4, 2012, the entire contents of which are hereby incorporated by reference.

TECHNICAL FIELD

This invention relates to a water-soluble surfactant composition, and more particularly, to a water-soluble surfactant composition having a low dynamic surface tension which when compounded in inks or paper coatings, may exert improved wettability, penetrability and foam inhibition and comply with high-speed printing or coating, and which clears recent environmental concerns. It also relates to an ink or paper coating formulation having the surfactant composition compounded therein.

BACKGROUND ART

In the modern era, printers for operation with personal computers and other electronic equipment become widespread rapidly in offices and households owing to their reduced price, improved print quality and improved reliability. Accordingly the demand for ink is expanding from household to industrial use. To further improve the quality, color, appearance, definition and shelf stability of printed images, the demand for ink makes a transition from the conventional dye ink to pigment and other inks having a higher level of properties. A wider variety of inks are now available.

Also in the printing and papermaking industries, a transition to aqueous systems is under way in view of current environmental concerns. Since the water-based systems are slow in drying speed and thus slow in manufacturing speed as compared with the solvent-based systems, the water-based systems are always required to catch up with higher speed operation for productivity improvements. Thus ink and paper coating formulations are required to improve their performance so as to comply with high-speed printing or coating conditions.

Under the circumstances, the ink and aqueous paint industries need a surfactant having an ability to reduce the surface tension of water for imparting wetting, penetrating and dispersing properties relative to substrates. The important factor to be considered for a choice of surfactant is a static surface tension when the system is at rest, but a dynamic surface tension when the system is applied at high speeds to meet the demand for higher printing speeds for productivity improvements.

In the prior art, ethylene oxide adducts of nonyl phenol and polyoxyalkylene alkyl ethers are regarded useful as wetting agents and dispersing aids for ink and coating formulations. However, the use of ethylene oxide adducts of nonyl phenol poses a concern because of possible containment of environmental hormones. The polyoxyalkylene alkyl ethers are safe, but have a high foamability to adversely affect pigment dispersion, failing to accommodate high-speed printing.

Patent Documents 1 to 4 propose water-soluble surfactant compositions comprising a polyoxyalkylene alkyl ether and an acetylene glycol surfactant such as 2,4,7,9-tetramethyl-5-decyne-4,7-diol or its ethoxylate. Although these surfactant compositions have improved surface tension reducing, contact angle reducing and foam controlling capabilities, the recent advance in the high-speed printing technology poses a demand for a surfactant composition having further improved pigment dispersing and foam controlling capabilities.

Patent Document 5 discloses a glycidyl ether-capped acetylenic diol ethoxylate. Despite good surface tension reducing, wetting and foam controlling capabilities, its water solubility is insufficient to form a transparent coating formulation, failing to meet satisfactory performance.

CITATION LIST

Patent Document 1: JP-A 2002-348500
Patent Document 2: JP-A 2003-113397
Patent Document 3: JP-A 2003-253599
Patent Document 4: JP-A 2003-080839
Patent Document 5: JP-A 2003-238472 (U.S. Pat. No. 6,717,019, EP 1333048B1)

DISCLOSURE OF INVENTION

An object of the invention is to provide a water-soluble surfactant composition which exerts improved foam controlling and dispersing capabilities, has a low dynamic surface tension to impart wetting and penetrating properties, is water soluble, obviates environmental concerns, and complies with high-speed printing and application conditions. Another object is to provide an ink or paper coating formulation having the surfactant composition compounded therein.

The inventors have found that a water-soluble surfactant composition comprising (A) a glycidyl ether-capped acetylenic diol ethoxylate and (B) a polyoxyalkylene alkyl ether having an HLB in a specific range, when compounded in ink and paper coating formulations, exerts improved foam controlling and dispersing capabilities, has a low dynamic surface tension to impart wetting and penetrating properties, is water soluble, and complies with high-speed printing and application conditions. In addition, the composition clears current environmental concerns.

In one aspect, the invention provides a water-soluble surfactant composition comprising (A) 1 to 60% by weight of a glycidyl ether-capped acetylenic diol ethoxylate having the average compositional formula (I):

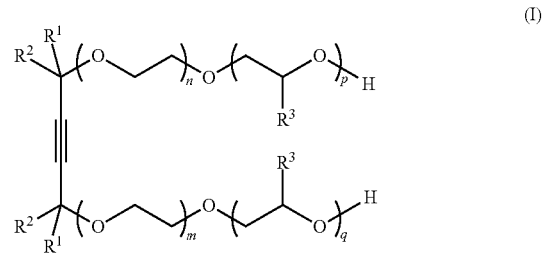

wherein $R^1$ is independently hydrogen, a linear $C_1$-$C_6$ alkyl group or branched or cyclic $C_3$-$C_6$ alkyl group; $R^2$ is independently a linear $C_1$-$C_{12}$ alkyl group or branched or cyclic $C_3$-$C_{12}$ alkyl group; $R^3$ is —$CH_2OR^4$, $R^4$ is independently a linear $C_2$-$C_{30}$ alkyl group, branched or cyclic $C_3$-$C_{10}$ alkyl group, $C_2$-$C_{30}$ alkenyl group, $C_6$-$C_{30}$ aryl group or $C_7$-$C_{30}$ aralkyl group; n, m, p and q are positive numbers, n+m has an average value from 1 to 100, and p+q has an average value from 0.5 to 5, and (B) 40 to 99% by weight of a polyoxyalkylene alkyl ether having the average compositional formula (II):

$$R^5O(C_2H_4O)_a(C_3H_6O)_b(C_2H_4O)_c(C_3H_6O)_d \quad (II)$$

wherein $R^5$ is a linear, branched or cyclic $C_5$-$C_{20}$ alkyl group, a, b, c and d are 0 or positive numbers from 0 to 25, with the proviso that either one of a and b is not equal to 0, $0 \le a+c \le 50$, and $0 \le b+d \le 30$, said polyoxyalkylene alkyl ether having an HLB value from 8 to 18.

Preferably, the glycidyl ether in component (A) is 2-ethylhexydyl glycidyl ether and/or lauryl glycidyl ether.

Also preferably, $R^5$ in formula (II) is a linear, branched or cyclic $C_5$-$C_{15}$ alkyl group.

When the surfactant composition is prepared as a 0.1% by weight aqueous solution, it preferably has a contact angle of up to 20 degrees after 30 seconds from droplet deposition and a dynamic surface tension of up to 56 mN/m at both 1 Hz and 10 Hz.

Also provided are an ink formulation and a paper coating formulation, having compounded therein the water-soluble surfactant composition defined above.

Advantageous Effects of Invention

The water-soluble surfactant composition has a low contact angle immediately after droplet deposition and a low dynamic surface tension. When added to inks, the surfactant composition exerts substrate wetting, substrate penetrating and foam controlling properties. When added to paper coatings, the surfactant composition serves to assist in dispersion of fine particles in the acceptor layer, enhances printing and color developing properties, complies with high-speed printing and application conditions, and clears any environmental concerns. Because of these advantages, the surfactant composition is very useful in the industry.

DESCRIPTION OF PREFERRED EMBODIMENTS

As used herein, the notation (Cn-Cm) means a group containing from n to m carbon atoms per group.

One embodiment of the invention is a water-soluble surfactant composition comprising (A) a glycidyl ether-capped acetylenic diol ethoxylate and (B) a polyoxyalkylene alkyl ether having an HLB in a specific range.

Component (A) is a glycidyl ether-capped acetylenic diol ethoxylate which is an acetylenic diol ethoxylate whose terminal OH is bonded to the epoxy moiety of glycidyl ether. Component (A) has the average compositional formula (I).

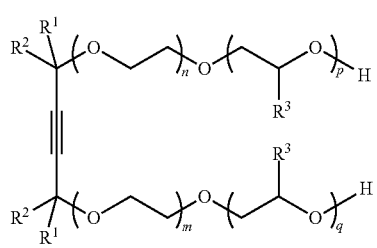

Herein $R^1$ is independently hydrogen, a linear $C_1$-$C_6$ alkyl group or branched or cyclic $C_3$-$C_6$ alkyl group, preferably a linear, branched or cyclic $C_3$-$C_5$ alkyl group, and most preferably isobutyl or isopentyl. $R^2$ is independently a linear $C_1$-$C_{12}$ alkyl group or branched or cyclic $C_3$-$C_{12}$ alkyl group, preferably a linear $C_1$-$C_5$ alkyl group or branched or cyclic $C_3$-$C_5$ alkyl group, and most preferably methyl. $R^3$ is —$CH_2OR^4$, wherein $R^4$ is independently a linear $C_2$-$C_{30}$, preferably $C_2$-$C_{15}$, alkyl group, branched or cyclic $C_3$-$C_{30}$ alkyl group, $C_2$-$C_{30}$ alkenyl group, $C_6$-$C_{30}$ aryl group or $C_7$-$C_{30}$ aralkyl group, more preferably a linear or branched $C_5$-$C_{15}$ alkyl group, and most preferably ethylhexyl or lauryl. The subscripts n, m, p and q are positive numbers, n+m has an average value from 1 to 100, preferably from 3 to 30, and more preferably from 8 to 20, and p+q has an average value from 0.5 to 5, preferably from 0.8 to 2.

Component (A) is prepared by ethoxylating an acetylenic diol having the formula:

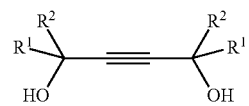

wherein $R^1$ and $R^2$ are as defined above, and reacting the ethoxylate with an oxirane-containing compound to form an addition product.

The preferred starting reactant is an acetylenic diol of the above formula wherein $R^1$ is a linear, branched or cyclic $C_3$-$C_5$ alkyl group, and $R^2$ is methyl. The more preferred starting reactant is an acetylenic diol of the above formula wherein $R^1$ is a linear, branched or cyclic $C_4$-$C_5$ alkyl group, and $R^2$ is methyl. The most preferred starting reactant is an acetylenic diol of the above formula wherein $R^1$ is isobutyl or isopentyl and $R^2$ is methyl.

In the step of forming the ethoxylate intermediate, ethylene oxide is used in an amount varying from 1 mole to 100 moles per mole of OH groups on the acetylenic diol. The preferred intermediate contains 3 to 30 moles of ethylene oxide per mole of OH groups on the acetylenic diol. The most preferred intermediate contains 8 to 20 moles of ethylene oxide per mole of OH groups on the acetylenic diol.

A glycidyl ether is preferably used as the capping agent for the intermediate. The glycidyl ether is typically of the formula:

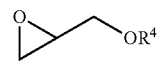

wherein $R^4$ is a linear preferably $C_2$-$C_{15}$, alkyl group, branched or cyclic $C_3$-$C_{30}$ alkyl group, alkenyl group, $C_6$-$C_{30}$ aryl group or $C_7$-$C_{30}$ aralkyl group, more preferably a linear or branched $C_5$-$C_{10}$ alkyl group, and most preferably ethylhexyl or lauryl. An appropriate amount of glycidyl ether used is 0.5 to 5 moles, more preferably 0.8 to 2 moles per mole of OH groups on the acetylenic diol ethoxylate.

Preferred examples of the glycidyl ether include ethyl glycidyl ether, butyl glycidyl ether, hexyl glycidyl ether, octyl glycidyl ether, 2-ethylhexyl glycidyl ether, dodecyl glycidyl ether (or lauryl glycidyl ether), octadecyl glycidyl ether, phenyl glycidyl ether, and cresyl glycidyl ether. Inter alfa, butyl glycidyl ether, 2-ethylhexyl glycidyl ether and lauryl glycidyl ether are preferred. Those of the following structural formulae are most preferred.

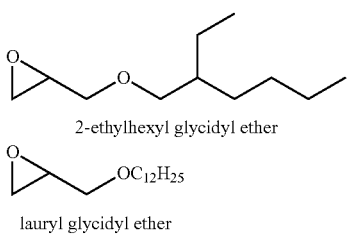
2-ethylhexyl glycidyl ether

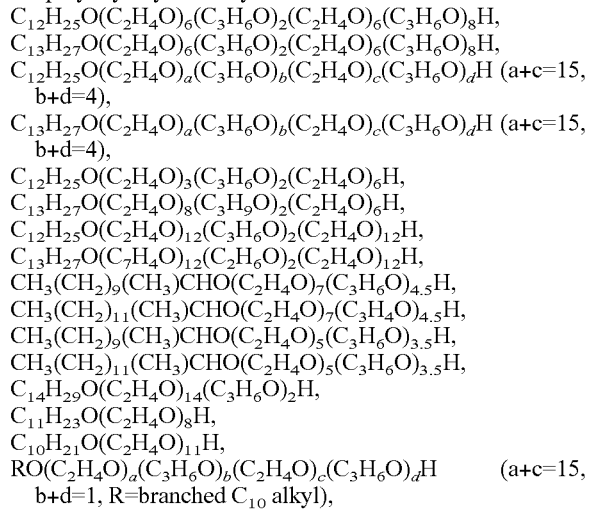
lauryl glycidyl ether

Examples of the glycidyl ether-capped acetylenic diol ethoxylate as component (A) include those described in Patent Document 5.

In preparing the water-soluble surfactant composition, component (A) is compounded in an amount of 1 to 60% by weight, preferably 1.5 to 40% by weight based on the composition (which is 100% by weight). For use in paper coatings, if component (A) is less than 1 wt %, the resulting formulation is likely to foam and inefficient to coat because thickness unevenness and other defects form upon application; and if component (A) exceeds 60 wt %, the resulting formulation is less water soluble and forms coating defects. For use in inks, if component (A) is less than 1 wt %, the resulting formulation is likely to foam, causing oozing upon printing; and if component (A) exceeds 60 wt %, the resulting formulation is less water soluble and causes oozing upon printing.

Component (B) is a polyoxyalkylene alkyl ether having the average compositional formula (II):

$$R^5O(C_2H_4O)_a(C_3H_6O)_b(C_2H_4O)_c(C_3H_6O)_dH \quad (II)$$

wherein $R^5$ is a linear, branched or cyclic $C_5$-$C_{20}$ alkyl group, a, b, c and d are 0 or positive numbers from 0 to 25, with the proviso that either one of a and b is not equal to 0, $0 \leq a+c \leq 50$, and $0 \leq b+d \leq 30$.

Specifically, $R^5$ is a linear, branched or cyclic $C_5$-$C_{20}$ alkyl group, preferably a linear, branched or cyclic $C_5$-$C_{15}$, more preferably $C_{10}$-$C_{14}$ alkyl group, and even more preferably a branched $C_{10}$-$C_{14}$ alkyl group. The subscripts a, b, c and d are 0 or positive numbers from 0 to 25, a+b+c+d is a positive number from 2 to 60, preferably from 5 to 50, either one of a and b is not equal to 0, $0 \leq a+c \leq 50$, preferably $3 \leq a+c \leq 45$, and $0 \leq b+d \leq 30$, preferably $0 \leq b+d \leq 10$.

The polyoxyalkylene alkyl ether as component (B) is not particularly limited as long as it has formula (II). Examples of the polyoxyalkylene alkyl ether include:
$C_{12}H_{25}O(C_2H_4O)_6(C_3H_6O)_2(C_2H_4O)_6(C_3H_6O)_8H$,
$C_{13}H_{27}O(C_2H_4O)_6(C_3H_6O)_2(C_2H_4O)_6(C_3H_6O)_8H$,
$C_{12}H_{25}O(C_2H_4O)_a(C_3H_6O)_b(C_2H_4O)_c(C_3H_6O)_dH$ (a+c=15, b+d=4),
$C_{13}H_{27}O(C_2H_4O)_a(C_3H_6O)_b(C_2H_4O)_c(C_3H_6O)_dH$ (a+c=15, b+d=4),
$C_{12}H_{25}O(C_2H_4O)_3(C_3H_6O)_2(C_2H_4O)_6H$,
$C_{13}H_{27}O(C_2H_4O)_8(C_3H_9O)_2(C_2H_4O)_6H$,
$C_{12}H_{25}O(C_2H_4O)_{12}(C_3H_6O)_2(C_2H_4O)_{12}H$,
$C_{13}H_{27}O(C_7H_4O)_{12}(C_2H_6O)_2(C_2H_4O)_{12}H$,
$CH_3(CH_2)_9(CH_3)CHO(C_2H_4O)_7(C_3H_6O)_{4.5}H$,
$CH_3(CH_2)_{11}(CH_3)CHO(C_2H_4O)_7(C_3H_4O)_{4.5}H$,
$CH_3(CH_2)_9(CH_3)CHO(C_2H_4O)_5(C_3H_6O)_{3.5}H$,
$CH_3(CH_2)_{11}(CH_3)CHO(C_2H_4O)_5(C_3H_6O)_{3.5}H$,
$C_{14}H_{29}O(C_2H_4O)_{14}(C_3H_6O)_2H$,
$C_{11}H_{23}O(C_2H_4O)_8H$,
$C_{10}H_{21}O(C_2H_4O)_{11}H$,
$RO(C_2H_4O)_a(C_3H_6O)_b(C_2H_4O)_c(C_3H_6O)_dH$ (a+c=15, b+d=1, R=branched $C_{10}$ alkyl),
$RO(C_2H_4O)_a(C_3H_6O)_b(C_2H_4O)_c(C_3H_6O)_dH$ (a+c=4, b+d=1, R=branched $C_{10}$ alkyl),
$RO(C_2H_4O)_a(C_3H_6O)_b(C_2H_4O)_d(C_3H_6O)_dH$ (a+c=44, b+d=1, R=branched $C_{10}$ alkyl),
$RO(C_2H_4O)_a(C_3H_6O)_b(C_2H_4O)_c(C_3H_9O)_dH$ (a+c=19, b+d=1, R=linear $C_{14}$ alkyl),
$RO(C_2H_4O)_a(C_3H_6O)_b(C_2H_4O)_c(C_3H_6O)_dH$ (a+c=19, b+d=1, R=branched $C_{14}$ alkyl),
$RO(C_2H_4O)_{11}H$ (R=linear $C_{10}$ alkyl).

These polyoxyalkylene alkyl ethers may be used alone or in admixture of two or more.

The polyoxyalkylene alkyl ether should have an HLB (hydrophilic-lipophilic balance) value from 8 to 18, preferably from 9 to 15. A compound with an HLB of less than 8 is more hydrophobic and less soluble in water, failing to provide water solubility. A compound with an HLB in excess of 18 has a higher dynamic surface tension and is prone to foam, and causes oozing (or bleeding) upon printing.

It is noted that the HLB value is a relative value computed for a particular surfactant on a scale of 0 to 20 based on the assumption that a phantom compound having the highest hydrophilicity because of an infinitely long hydrophilic group added to a lipophilic group has a value of 20 and a lipophilic compound free of hydrophilic groups has a value of 0. In general, the HLB value is computed according to Griffin's equation:

$$HLB = 20*Mw/M$$

wherein M is the molecular weight of a nonionic surfactant and Mw is the molecular weight of its hydrophilic portion.

In preparing the water-soluble surfactant composition, component (B) is compounded in an amount of 40 to 99% by weight, preferably 60 to 98.5% by weight based on the surfactant composition (=100% by weight). A surfactant composition with less than 40 wt % of component (B) is insufficient to solubilize the acetylenic glycol (A), allowing agglomerates to form, and ineffective in dispersing pigments. A surfactant composition with more than 99 wt % of component (B) is likely to foam, and forms printing defects due to poor pigment dispersion and inefficient discharge, or coating defects due to unevenness.

In the inventive surfactant composition, it is undesired to use other surfactants such as anionic and cationic surfactants because they may render the composition more foamable.

The water-soluble surfactant composition may comprise a third component (C) which is deionized water or a water-soluble organic solvent such as ethylene glycol, diethylene glycol, triethylene glycol, tetraethylene glycol, polyethylene glycol, propylene glycol, 1,3-propanediol, 1,4-butanediol, or glycerol. As long as the properties of the surfactant composition are not adversely affected, third component (C) may be added in an amount of 0 to 39%, preferably 0 to 30%, and more preferably 0 to 25% by weight based on the surfactant composition (=100% by weight). When used, component (C) is preferably added in an amount of at least 5% by weight.

The water-soluble surfactant composition may be prepared, for example, by mixing the foregoing components by a well-known mixing preparatory method using a propeller type agitator or similar impeller. If desired, those components which are solid at room temperature are heated prior to mixing.

In a preferred embodiment, when a 0.1% by weight aqueous solution of the surfactant composition is prepared, the solution has a contact angle of up to 20 degrees, more preferably 5 to 15 degrees at 30 seconds since droplet deposition, and a dynamic surface tension of up to 56 mN/m, more preferably 18 to 50 mN/m, and even more preferably 20 to 46 mN/m both at a frequency of 1Hz and 10 Hz.

Also preferably, the water-soluble surfactant composition has an ability to control foam with respect to a water-soluble polymer. The foam control index preferably corresponds to a foam height of up to 37 ml, more preferably up to 30 ml immediately after shaking, and a foam height of up to 18 ml, more preferably up to 15 ml after 5 minutes.

The water-soluble polymer is not particularly limited and a suitable polymer may be selected from well-known polymers. For example, naturally occurring water-soluble polymers include plant derived polymers such as gum arabi, tragacanth gum, guar gum, karaya gum, locust bean gum, arabinogalactan, pectin, and quince seed starch; seaweed derived polymers such as alginic acid, carrageenan and agar; animal derived polymers such as gelatin, casein, albumin and collagen; microbial polymers such as xanthene gum and dextran. Examples of water-soluble polymers obtained from chemical modification of naturally occurring substances include cellulosic polymers such as methyl cellulose, ethyl cellulose, hydroxyethyl cellulose, hydroxypropyl cellulose, and carboxymethyl cellulose; starch derived polymers such as starch sodium glycolate, and starch sodium phosphate; and sea weed derived polymers such as propylene glycol alginate. Examples of synthetic water-soluble polymers include vinyl polymers such as polyvinyl alcohol, polyvinyl pyrrolidone, and polyvinyl methyl ether; acrylic resins such as polyacrylamide, polyacrylic acid or alkali metal salts thereof, and water-soluble styrene-acrylic resins; water-soluble styrene maleic acid resins, water-soluble vinyl naphthalene acrylic resins, water-soluble vinyl naphthalene maleic acid resins, polyvinyl pyrrolidone, polyvinyl alcohol, polyallyl amine, polyethylene imine, and β-naphthalene-sulfonic acid-formaldehyde condensates having an alkali metal salt, or salt with quaternary ammonium and cationic functional groups (such as amino) as a pendant.

Notably, the contact angle is measured by a contact angle meter CA-D (Kyowa Interface Science Co., Ltd.) at a time of 30 seconds since a 0.1 wt % aqueous solution of the surfactant composition is deposited as a droplet. The dynamic surface tension is measured at a frequency of 1 Hz and 10 Hz by a bubble pressure type dynamic surface tensiometer Kruss BP-100 (Kruss GmbH) using a 0.1 wt % aqueous solution of the surfactant composition. Foam control is determined by placing 20 ml of a 0.1 wt % aqueous solution of the surfactant composition in a 100-ml measuring cylinder, shaking the cylinder for one minute under conditions of 180 cycles/min× 40 mm, and measuring the height or volume (in milliliter) of foam immediately after shaking and after 5 minutes of standing.

If the contact angle of a 0.1 wt % aqueous solution of the surfactant composition exceeds 20 degrees after 30 seconds from droplet deposition, the composition when compounded in ink can cause crawling, worsen absorption, and invite ink oozing. If the dynamic surface tension at 1Hz and 10 Hz of a 0.1 wt % aqueous solution of the surfactant composition exceeds 56 mN/m, crawling and oozing (due to short penetrating power) can occur when printed by a printing machine or applicator, even though no crawling is recognized during brush coating and bar coater coating. If the height or volume of foam immediately after shaking exceeds 37 ml, ink oozing can occur due to poor dispersion of ink.

When the water-soluble surfactant composition is used to manufacture ink or as an aqueous wetting agent in paper coating, it is desirable to include the surfactant composition in an amount of 0.05 to 10% by weight, and more preferably 0.05 to 5% by weight, based on the overall amount of ink or paper coating.

In the embodiment where the water-soluble surfactant composition is used to manufacture ink, the ink formulation may comprise the surfactant composition and any component or components selected from colorants, solvents (e.g., water and organic solvents), resins and other additives, if desired.

The colorants used herein include dyes, organic pigments and inorganic pigments. Suitable dyes include those dyes classified as acidic dyes, direct dyes, reactive dyes, vat dyes, and sulfur dyes according to the Color Index, as well as food dyes, oil dyes and basic dyes. Suitable pigments for black ink use include carbon blacks (C.I. Pigment Black 7) such as furnace black (color black), lamp black, acetylene black, and channel black. Specific examples include Raven 7000, Raven 5750, Raven 5250, Raven 5000, Raven 3500, Raven 2000, Raven 1500, Raven 1250, Raven 1200, Raven 1190 ULTRA-II, Raven 1170, Raven 1255 (available from Columbia); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (available from Cabot); Color Black FW1, Color Black FW2, Color Black FW2V, Color Black FW18, Color Black FW200, Color Black S150, Color Black S160, Color Black 5170, Printex 35, Printex U, Printex V, Printex 140U, Printex 140V, Special Black 6, Special Black 5, Special Black 4A, Special Black 4 (available from Degussa); No. 25, No. 33, No. 40, No. 47, No. 52, No. 900, No. 2300, MCF-88, MA600, MA7, MA8 and MA100 (available from Mitsubishi Chemical Co., Ltd.); metals such as copper oxide, iron oxide (C.I. Pigment Black 11), titanium oxide; and organic pigments such as aniline black (C.I. Pigment Black 1). Suitable pigments for color ink use include C.I. Pigment Yellow 1 (Fast Yellow G), 3, 12 (Disazo Yellow AAA), 13, 14, 17, 24, 34, 35, 37, 42 (yellow iron oxide), 53, 55, 74, 81, 83 (Disazo Yellow HR), 93, 94, 95, 97, 98, 100, 101, 104, 108, 109, 110, 117, 120, 128, 138, 153, 180, C.I. Pigment Red 1, 2, 3, 5, 17, 22 (Brilliant Fast Scarlet), 23, 31, 38, 48:2 (Permanent Red 2B(Ba)), 48:2 (Permanent Red 2B(Ca)), 48:3 (Permanent Red 2B(Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 6G Rake), 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 202, 206, 209, 219, C.I. Pigment Violet 19, 23, C.I. Pigment Orange 36, C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, 63, C.I. Pigment Green 1, 4, 7, 8, 10, 17, 18, 36, etc.

Although the amount of colorant used to prepare ink is not particularly limited, an appropriate amount is 0.1 to 15% by weight, more preferably 2 to 10% by weight based on the ink formulation.

Suitable solvents include water; glycols such as ethylene glycol, diethylene glycol, trimethylene glycol, propylene glycol, dipropylene glycol, tripropylene glycol, polyethylene glycols having a molecular weight of up to 2,000, 1,3-propylene glycol, isopropylene glycol, isobutylene glycol, 1,4-butanediol, 1,3-butanediol, 1,5-pentanediol, 1,6-hexanediol, glycerol, mesoerythritol, and pentaerythritol; alkyl alcohols of 1 to 4 carbon atoms, glycol ethers, formaldehyde, acetamide, dimethyl sulfoxide, sorbitol, sorbitan, acetylene, diacetin, triacetin, and sulfolane. These solvents may be used alone or in admixture of two or more.

Although the amount of solvent used to prepare ink is not particularly limited, an appropriate amount is 50 to 99% by weight, more preferably 60 to 95% by weight based on the ink formulation.

The resins are preferably polymers derived from a substance having at least one hydrophobic group selected from alkyl, cycloalkyl and aryl groups. The preferred substance further has a hydrophilic group selected from carboxyl, sulfonate, hydroxyl, amino, and amide groups, and bases thereof. Examples of the substances to form dispersing polymers include monomers having a double bond-bearing group such as acryloyl, methacryloyl, vinyl or aryl, and oligomers thereof. Examples include styrene, tetrahydrofurfuryl acrylate, butyl methacrylate, ($\alpha$, 2, 3 or 4)-alkylstyrenes, ($\alpha$, 2, 3 or 4)-alkoxystyrenes, 3,4-dimethylstyrene, $\alpha$-phenylstyrene, divinylbenzene, vinyl naphthalene, dimethyl amino(meth)acrylate, dimethylaminoethyl(meth)acrylate, dimethylaminopropyl acrylamide, N,N-dimethylaminoethyl acrylate, acryloyl morpholine, N,N-dimethylacrylamide, N-isopropylacrylamide, N,N-diethylacrylamide, methyl(meth)acrylate, ethyl(meth)acrylate, propyl(meth)acrylate, ethylhexyl(meth)acrylate, other alkyl(meth)acrylates, methoxydiethylene glycol(meth)acrylate, ethoxy, propoxy, or butoxy-bearing diethylene glycol or polyethylene glycol(meth)acrylate, cyclohexyl(meth)acrylate, benzyl(meth)acrylate, phenoxyethyl(meth)acrylate, isobornyl(meth)acrylate, hydroxyalkyl (meth)acrylates, fluorine, chlorine or silicon-bearing(meth)acrylates, (meth)acrylamides, and maleic acid amides. Where it is desired to introduce a crosslinking structure into (meth)acrylic acid or the like in addition to its mono-functionality, compounds having an acrylic or methacrylic group may be used, for example, (mono, di, tri, tetra, poly)ethylene glycol di(meth)acrylates, (meth)acrylates of diols such as 1,4-butanediol, 1,5-pentanediol, 1,6-hexanediol, 1,8-octanediol and 1,10-decanediol, trimethylolpropane tri(meth)acrylate, glycerol(di, tri)-(meth)acrylates, di(meth)acrylates of bisphenol A or F ethylene oxide adducts, neopentyl glycol di(meth)acrylate, pentaerythritol tetra(meth)acrylate, and dipentaerythritol hexa(meth)acrylate.

Although the amount of resin used to prepare ink is not particularly limited, an appropriate amount is 0 to 30% by weight, more preferably 0 to 20% by weight based on the ink formulation. When used, the resin is preferably added in an amount of at least 1% by weight.

Other additives include UV absorbers, antioxidants, pH modifiers, preservatives, and viscosity modifiers. These additives may be used as the balance of the ink formulation (to sum to 100% by weight) excluding the foregoing components.

An ink formulation may be prepared by combining the surfactant composition, colorant, solvent, resin and other additives, specifically by dispersing, dissolving, mixing and agitating the components. The resulting ink formulation has improved characteristics. Preferably the ink formulation is adjusted to a viscosity of from more than 0 to 4 mPa·s to provide better printability.

In the other embodiment where the water-soluble surfactant composition is used to manufacture a paper coating, the paper coating formulation may comprise the surfactant composition, fine particles, hydrophilic binders and other additives.

Suitable fine particles are those of at least one type selected from among organic fine particles, silica fine particles, alumina fine particles, and pseudo-boehmite aluminum hydroxide fine particles. Inter alia, silica, alumina, and pseudo-boehmite aluminum hydroxide fine particles are preferred. The fine powder should Preferably have an average primary particle size of up to 50 nm, more preferably up to 30 nm, and most preferably up to 15 nm. Particularly when the average primary particle size is up to 15 nm, such nano-size particles are more effective for improving ink absorption characteristics and at the same time, for enhancing the surface luster of an ink acceptor layer. Although the lower limit of average primary particle size is not critical, a size of at least 1 nm is preferred.

Although the amount of fine particles used to prepare paper coating is not particularly limited, an appropriate amount is 1 to 50% by weight, more preferably 5 to 40% by weight based on the paper coating formulation.

Suitable hydrophilic binders include polyvinyl alcohol, oxidized starch, etherified starch, cellulose derivatives such as carboxymethyl cellulose and hydroxyethyl cellulose, casein, gelatin, soybean protein, silanol-modified polyvinyl alcohol, styrene-butadiene copolymers, conjugated diene latexes such as methyl methacrylate-butadiene copolymers, acrylic copolymer latexes such as acrylate and methacrylate copolymers, vinyl polymer latexes such as ethylene-vinyl acetate copolymers, and synthetic resins such as maleic anhydride resins, melamine resins, urea resins, polymethyl methacrylate, polyurethane resins, unsaturated polyesters, polyvinyl butyral, and alkyd resins. These compounds may be used alone or in admixture of two or more.

Among the foregoing water-soluble resins, it is preferred from the standpoint of ink absorption to select the binder from polyvinyl alcohol resins, cellulose resins, ether bond-containing resins, carbamoyl-containing resins, carboxyl-containing resins, gelatins, and mixtures thereof. Where polyvinyl alcohol is used, it is preferred for color density that the polyvinyl alcohol have a saponification degree of at least 82 mol %, and more preferably 86 to 99 mol %. It is also preferred for film strength that the polyvinyl alcohol have a degree of polymerization of 300 to 4,500, and more preferably 500 to 2,600.

Although the amount of hydrophilic binder used to prepare paper coating is not particularly limited, a 1 to 5 wt % aqueous solution of the binder is preferably used in an amount of 45 to 95% by weight, more preferably 55 to 90% by weight based on the paper coating formulation.

Other additives include pigment dispersants, thickeners, flow improvers, defoamers, foam inhibitors, parting agents, blowing agents, penetrants, coloring dyes, coloring pigments, fluorescent brighteners, UV absorbers, antioxidants, preservatives, antifungal agents, water-proof whitening agents, wet paper strength enhancers, and dry paper strength enhancers. These additives may be used as the balance of the paper coating formulation (to sum to 100% by weight) excluding the foregoing components.

The paper coating formulation may be prepared by combining the surfactant composition, fine powder, hydrophilic binder and other additives. The coating formulation is applied to the surface of a paper sheet subject to printing, by any well-known techniques such as dipping, spraying and coating, typically gravure coating, yielding a coated paper sheet. The coating operation is preferably controlled so as to provide a coating weight of 3 to 50 g/m$^2$, more preferably 5 to 20 g/m$^2$ and a speed of 20 to 2,000 m/min, more preferably 40 to 2,000 m/min.

EXAMPLE

Examples are given below by way of illustration and not by way of limitation. All parts and percents are by weight.

Example 1

A vessel equipped with a propeller-type agitator was charged with 2 parts of 2-ethylhexyl glycidyl ether-capped acetylenic diol ethoxylate (A-1), identified below, which was heated at 70° C. With stirring, 78 parts of polyoxyalkylene alkyl ether (B-1), identified below, 5 parts of propylene glycol, and 15 parts of water were gradually added and mixed.

After 2 hours of continuous stirring, the mixture was cooled to room temperature. After cooling, the mixture was filtered through a 200-mesh fabric filter, yielding a surfactant composition M-1.

Examples 2 to 9 and Comparative Examples 1 to 8

As in Example 1, surfactant compositions M-2 to M-17 were prepared according to the recipe shown in Table 1.

2) Dynamic Surface Tension

The dynamic surface tension of the 0.1% aqueous solution of the surfactant composition was measured at 1 Hz and 10 Hz by a bubble pressure type dynamic tensiometer Kruss BP-100 (Krüss GmbH).

3) Contact Angle

Using a contact angle meter CA-D (Kyowa Interface Science Co., Ltd.), the contact angle of the 0.1% aqueous solution of the surfactant composition was measured at 30 sec-

TABLE 1

| Component (pbw) | Example | | | | | | | | | Comparative Example | | | | | | | |
|---|---|---|---|---|---|---|---|---|---|---|---|---|---|---|---|---|---|
| | 1 M-1 | 2 M-2 | 3 M-3 | 4 M-4 | 5 M-5 | 6 M-6 | 7 M-7 | 8 M-8 | 9 M-9 | 1 M-10 | 2 M-11 | 3 M-12 | 4 M-13 | 5 M-14 | 6 M-15 | 7 M-16 | 8 M-17 |
| A-1 | 2 | 1 | 30 | 2 | 2 | 5 | 20 | | 5 | 0.5 | 45 | | | 2 | 100 | | 2 |
| A-2 | | | | | | | | 20 | | | | | | | | | |
| A'-1 | | | | | | | | | | | | 2 | | | | | |
| A'-2 | | | | | | | | | | | | | 2 | | | | |
| B-1 | 78 | 79 | 50 | | | | | 60 | | 79.5 | 35 | 78 | 78 | | | 100 | |
| B-2 | | | | 78 | | | | | | | | | | | | | |
| B-3 | | | | | 78 | | | | | | | | | | | | |
| B-4 | | | | | | 75 | | | | | | | | | | | |
| B-5 | | | | | | | 60 | | | | | | | | | | |
| B-6 | | | | | | | | | 75 | | | | | | | | |
| B'-1 | | | | | | | | | | | | | | 78 | | | |
| B'-2 | | | | | | | | | | | | | | | | | 78 |
| propylene glycol | 5 | | | | | | | | | 5 | 5 | | | | | | |
| ethylene glycol | | | 20 | 20 | 20 | | | | 20 | | | 20 | 20 | 20 | | | 20 |
| glycerol | | 5 | | | | 20 | 20 | 20 | | | | | | | | | |
| water | 15 | 15 | | | | | | | | 15 | 15 | | | | | | |

A-1: adduct of 2-ethylhexyl glycidyl ether-capped 2,4,7,9-tetramethyl-5-decyne-4,7-diol with ethylene oxide (of formula (I) wherein average n + m = ~10, average p + q = ~2)
A-2: adduct of lauryl glycidyl ether-capped 2,4,7,9-tetramethyl-5-decyne-4,7-diol with ethylene oxide (of formula (I) wherein average n + m = ~14, average p + q = ~2)
A'-1: adduct of 2,4,7,9-tetramethyl-5-decyne-4,7-diol with ethylene oxide (ethylene oxide added: 3.5 moles)
A'-2: adduct of 2,4,7,9-tetramethyl-5-decyne-4,7-diol with ethylene oxide (ethylene oxide added: 10 moles)
B-1: $RO(C_2H_4O)_a(C_3H_6O)_b(C_2H_4O)_c(C_3H_6O)_dH$ (a + c = 15, b + d = 1, a, b, c, d > 0, R = branched $C_{10}$ alkyl, HLB = 15)
B-2: $RO(C_2H_4O)_a(C_3H_6O)_b(C_2H_4O)_c(C_3H_6O)_dH$ (a + c = 4, b + d = 1, a, b, c, d > 0, R = branched $C_{10}$ alkyl, HLB = 9)
B-3: $RO(C_2H_4O)_a(C_3H_6O)_b(C_2H_4O)_c(C_3H_6O)_dH$ (a + c = 44, b + d = 1, a, b, c, d > 0, R = branched $C_{10}$ alkyl, HLB = 18)
B-4: $RO(C_2H_4O)_a(C_3H_6O)_b(C_2H_4O)_c(C_3H_6O)_dH$ (a + c = 19, b + d = 1, a, b, c, d > 0, R = linear $C_{14}$ alkyl, HLB = 15)
B-5: $RO(C_2H_4O)_{11}H$ (R = linear $C_{10}$ alkyl, HLB = 11)
B-6: $RO(C_2H_4O)_a(C_3H_6O)_b(C_2H_4O)_c(C_3H_6O)_dH$ (a + c = 19, b + d = 1, a, b, c, d > 0, R = branched $C_{14}$ alkyl, HLB = 15)
B'-1: $RO(C_2H_4O)_a(C_3H_6O)_b(C_2H_4O)_c(C_3H_6O)_dH$ (a + c = 93, b + d = 1, a, b, c, d > 0, R = branched $C_{10}$ alkyl, HLB = 19)
B'-2: $RO(C_2H_4O)_a(C_3H_6O)_b(C_2H_4O)_c(C_3H_6O)_dH$ (a + c = 24, b + d = 1, a, b, c, d > 0, R = linear $C_{21}$ alkyl, HLB = 15)

The properties of the surfactant compositions were measured as described below. The results are shown in Table 2.

1) Water Solubility

A 0.1% aqueous solution was prepared by adding 0.1 part of the surfactant composition to 100 parts of deionized water and stirring. The aqueous solution was observed for outer appearance and whether or not insoluble matter was present.

○: clear solution, with no insoluble matter

Δ: cloudy solution, with no insoluble matter

X: some insoluble matter observed onds since a droplet of the solution was deposited onto a test panel SUS-304 (Nippon Testpanel Co., Ltd.).

4) Foam Control

Foam control was evaluated by placing 20 ml of the 0.1% aqueous solution of the surfactant composition in a 100-ml measuring cylinder, shaking the cylinder for one minute under conditions of 180 cycles/min×40 mm, and measuring the height or volume (ml) of foam immediately after shaking and after 5 minutes of standing. A sample with a foam height of up to 37 ml at the end of shaking is acceptable, a height of up to 30 ml being more favorable. A sample with a foam height of up to 18 ml after 5 minutes is acceptable, a height of up to 15 ml being more favorable.

TABLE 2

| | Example | | | | | | | | | Comparative Example | | | | | | | |
|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 |
| Surfactant composition designation | M-1 | M-2 | M-3 | M-4 | M-5 | M-6 | M-7 | M-8 | M-9 | M-10 | M-11 | M-12 | M-13 | M-14 | M-15 | M-16 | M-17 |
| Water solubility | ○ | ○ | Δ | Δ | ○ | ○ | ○ | ○ | ○ | ○ | X | ○ | ○ | ○ | X | ○ | ○ |

TABLE 2-continued

|  |  | Example |  |  |  |  |  |  |  |  | Comparative Example |  |  |  |  |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 | 6 | 7 | 8 |
| Dynamic surface tension (mN/m) | 1 Hz | 34 | 34 | 36 | 34 | 42 | 40 | 38 | 36 | 38 | 34 | 37 | 34 | 34 | 45 | 40 | 34 | 44 |
|  | 10 Hz | 42 | 42 | 44 | 42 | 56 | 54 | 46 | 44 | 52 | 42 | 45 | 42 | 42 | 62 | 54 | 42 | 61 |
| Contact angle (°) | 30 s | 13 | 13 | 15 | 12 | 20 | 20 | 16 | 14 | 17 | 13 | 15 | 13 | 13 | 35 | 18 | 13 | 33 |
| Foam control (ml) | End of shaking | 25 | 30 | 5 | 15 | 30 | 25 | 10 | 10 | 30 | 39 | 3 | 39 | 40 | 38 | 2 | 40 | 29 |
|  | After 5 minutes | 10 | 15 | 0 | 3 | 15 | 10 | 2 | 2 | 15 | 18 | 0 | 19 | 20 | 30 | 0 | 40 | 14 |

[Ink Formulation]

Example 10

With stirring by a propeller-type agitator, 5 parts of a black pigment, Color Black S170 (Degussa) was gradually added to 70 parts of deionized water. Next, 1 part of surfactant composition M-1, 10 parts of polyethylene glycol (molecular weight 200) and 15 parts of glycerol were added to the dispersion, which was stirred for 1 hour, yielding an ink formulation X-1.

Magenta (M), cyan (C) and yellow (Y) ink formulations were similarly prepared aside from using a magenta pigment (C.I. Pigment Red 122), cyan pigment (C.I. Pigment Blue 15:3), and yellow pigment (C.I. Pigment Yellow 74) instead of the black pigment.

Examples 11 to 18 and Comparative Examples 9 to 16

As in Example 10, ink formulations X-2 to X-17 were prepared according to the recipe shown in Table 3, aside from using surfactant compositions M-2 to M-17.

The properties of the ink formulations were measured as described below. The results are shown in Table 3.

[Evaluation of Ink]
1) Ink Dispersion

Immediately after the ink formulation was prepared by dispersing as above, it was applied onto a glass plate using a doctor knife with a gap 1.5 mils. The coating was visually observed for unevenness caused by agglomerates.

○: no coating unevenness
X: uneven coating

If the dispersion of pigment is poor, factors like print density, dot diameter and color density of printed image may become deteriorated.

2) Viscosity

Using a Brookfield viscometer, the viscosity of the ink formulation was measured at 25° C.

3) Print Density

Using a printer MJ-930 (Seiko-Epson Co., Ltd.) and the black ink formulation, dots were printed on plain paper. The dot density was measured by a microdensitometer PDM-5 (Sakura Seiki Co., Ltd.). A sample having a dot density of 0.99 to 1.10 is acceptable, with a density of 1.01 to 1.10 being more favorable.

4) Dot Diameter

Using the printer MJ-930 and the black ink formulation, dots were printed on plain paper. The printed dots were enlarged by a magnification of ×100 and the dot diameters measured. A sample with a dot diameter of 200 to 250 μm is acceptable, with a diameter of 220 to 240 μm being more favorable.

5) Color Density of Printed Image

Using the printer MJ-930, the black (B), magenta (M), cyan (C) and yellow (Y) ink formulations were printed solid on plain paper. Color density was measured by a densitometer RD-918 (Macbeth). A sample with a color density of 1.35 to 2.00 is acceptable, with a density of 1.40 to 2.00 being more favorable.

6) Ink Absorption

Using the printer MJ-930, the black (B), magenta (M), cyan (C) and yellow (Y) ink formulations were concurrently injected to the same place on plain paper. One second later, the printed surface was rubbed with a paper pressing plate. The degree of ink smudging was rated according to the following criteria.

○: no smudging to unprinted (white) areas
Δ: limited smudging
X: severe smudging

TABLE 3

|  | Example |  |  |  |  |  |  |  |  |
|---|---|---|---|---|---|---|---|---|---|
|  | 10 | 11 | 12 | 13 | 14 | 15 | 16 | 17 | 18 |
| Ink formulation designation | X-1 | X-2 | X-3 | X-4 | X-5 | X-6 | X-7 | X-8 | X-9 |
| Surfactant composition designation | M-1 | M-2 | M-3 | M-4 | M-5 | M-6 | M-7 | M-8 | M-9 |

TABLE 3-continued

| | | | | | | | | | |
|---|---|---|---|---|---|---|---|---|---|
| Ink dispersion | ○ | ○ | ○ | ○ | ○ | ○ | ○ | ○ | ○ |
| Viscosity (mPa·s) | 2 | 3 | 3 | 3 | 2 | 3 | 3 | 3 | 3 |
| Print density | 1.04 | 1.02 | 1.03 | 1.03 | 1.01 | 1.02 | 1.02 | 1.02 | 1.03 |
| Dot diameter (μm) | 233 | 235 | 231 | 231 | 232 | 239 | 239 | 234 | 235 |
| Color density of printed image — B | 1.45 | 1.45 | 1.42 | 1.42 | 1.41 | 1.41 | 1.42 | 1.42 | 1.42 |
| M | 1.51 | 1.44 | 1.51 | 1.45 | 1.48 | 1.41 | 1.40 | 1.49 | 1.42 |
| C | 1.81 | 1.86 | 1.79 | 1.81 | 1.84 | 1.79 | 1.78 | 1.82 | 1.81 |
| Y | 1.49 | 1.47 | 1.51 | 1.47 | 1.47 | 1.45 | 1.44 | 1.46 | 1.46 |
| Ink absorption | ○ | ○ | ○ | ○ | ○ | ○ | ○ | ○ | ○ |

| | Comparative Example | | | | | | | |
|---|---|---|---|---|---|---|---|---|
| | 9 | 10 | 11 | 12 | 13 | 14 | 15 | 16 |
| Ink formulation designation | X-10 | X-11 | X-12 | X-13 | X-14 | X-15 | X-16 | X-17 |
| Surfactant composition designation | M-10 | M-11 | M-12 | M-13 | M-14 | M-15 | M-16 | M-17 |
| Ink dispersion | X | X | X | X | X | X | X | ○ |
| Viscosity (mPa·s) | 5 | 5 | 5 | 6 | 6 | 8 | 7 | 3 |
| Print density | 0.98 | 0.92 | 0.90 | 0.89 | 0.91 | 0.81 | 0.77 | 0.89 |
| Dot diameter (μm) | 287 | 282 | 281 | 289 | 287 | 287 | 295 | 283 |
| Color density of printed image — B | 1.29 | 1.26 | 1.21 | 1.25 | 1.22 | 1.12 | 1.15 | 1.21 |
| M | 1.30 | 1.26 | 1.24 | 1.22 | 1.21 | 1.19 | 1.16 | 1.20 |
| C | 1.25 | 1.23 | 1.26 | 1.21 | 1.18 | 1.16 | 1.15 | 1.19 |
| Y | 1.29 | 1.20 | 1.20 | 1.21 | 1.22 | 1.18 | 1.21 | 1.22 |
| Ink absorption | X | Δ | X | X | X | X | X | X |

[Paper Coating Formulation]

Example 19

To 100 parts of a 2.5% aqueous solution of polyvinyl alcohol (degree of polymerization 1,700, degree of saponification 98-99 mol %, Kuraray Poval 117 by Kuraray Co., Ltd.) were added 1 part of surfactant composition M-1 and 10 parts of silica fine powder (fumed silica, average primary particle size 7 nm, Aerosil 300 SF75 by Nippon Aerosil Co., Ltd.). The ingredients were mixed with a propeller-type agitator for 30 minutes, yielding a paper coating formulation Y-1.

Examples 20 to 27 and Comparative Examples 17 to 24

As in Example 19, paper coating formulations Y-2 to Y-17 were prepared according to the recipe shown in Table 4, aside from using surfactant compositions M-2 to M-17.

The properties of the coating formulations were measured as described below. The results are shown in Table 4.

[Evaluation of Paper Coating]

1) Silica Dispersion

Immediately after the paper coating formulation was prepared by dispersing as above, it was applied onto a glass plate using a doctor knife with a gap 6 mils. The presence of agglomerates in coating was visually observed.
○: no agglomerates
X: agglomerates observed If the dispersion of silica is poor, factors like printability, color development and ink absorption of coated paper may become deteriorated.

2) Crawling

Using a printability tester Gravo-Proof (Nissho Gravure Co., Ltd.), the paper coating formulation was applied onto unsized paper at a coating rate of 50 m/min and in a coating weight of 8 g/m². Coating surface defects such as cissing or crawling were visually examined and rated as follows.
○: No crawling, no pinholes
Δ: Some crawling and pinholes
X: Considerable crawling and pinholes 3) Foam Control A sample was prepared by diluting the paper coating formulation with water in a coating/water ratio of 1:2. Then 20 ml of the sample was placed in a 100-ml measuring cylinder, which was shaken for 1 minute on a shaker at 180 cycles/min. The volume (in ml) of foam was measured, both immediately at the end of shaking and 5 minutes of standing. A sample with a foam volume of up to 20 ml immediately after shaking is acceptable, with a volume of up to 15 ml being more favorable. A sample with a foam volume of up to 15 ml after 5 minutes is acceptable, with a volume of up to 10 ml being more favorable.

TABLE 4

| | | Example | | | | | | | | | Comparative Example | | | | | | | |
|---|---|---|---|---|---|---|---|---|---|---|---|---|---|---|---|---|---|---|
| | | 19 | 20 | 21 | 22 | 23 | 24 | 25 | 26 | 27 | 17 | 18 | 19 | 20 | 21 | 22 | 23 | 24 |
| Paper coating formulation designation | | Y-1 | Y-2 | Y-3 | Y-4 | Y-5 | Y-6 | Y-7 | Y-8 | Y-9 | Y-10 | Y-11 | Y-12 | Y-13 | Y-14 | Y-15 | Y-16 | Y-17 |
| Surfactant composition designation | | M-1 | M-2 | M-3 | M-4 | M-5 | M-6 | M-7 | M-8 | M-9 | M-10 | M-11 | M-12 | M-13 | M-14 | M-15 | M-16 | M-17 |
| Silica dispersion | | ○ | ○ | ○ | ○ | ○ | ○ | ○ | ○ | ○ | X | X | X | X | X | X | X | X |
| Crawling | | ○ | ○ | ○ | ○ | ○ | ○ | ○ | ○ | ○ | X | X | X | X | X | X | X | X |
| Foam control (ml) | End of shaking | 5 | 7 | 5 | 4 | 7 | 5 | 4 | 3 | 4 | 14 | 4 | 20 | 22 | 25 | 3 | 20 | 7 |
| | After 5 minutes | 5 | 7 | 1 | 3 | 7 | 4 | 2 | 1 | 3 | 12 | 1 | 20 | 22 | 25 | 0 | 20 | 6 |

Japanese Patent Application No. 2012-264967 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A water-soluble surfactant composition comprising
   (A) 1 to 60% by weight of a glycidyl ether-capped acetylenic diol ethoxylate having the average compositional formula (I):

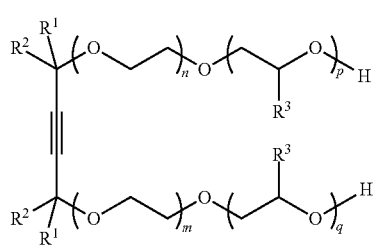

(I)

wherein $R^1$ is independently hydrogen, a linear $C_1$-$C_6$ alkyl group or branched or cyclic $C_3$-$C_6$ alkyl group; $R^2$ is independently a linear $C_1$-$C_{12}$ alkyl group or branched or cyclic $C_3$-$C_{12}$ alkyl group; $R^3$ is —$CH_2OR^4$, $R^4$ is independently a linear $C_2$-$C_{30}$ alkyl group, branched or cyclic $C_3$-$C_{30}$ alkyl group, $C_2$-$C_{30}$ alkenyl group, $C_6$-$C_{30}$ aryl group or $C_7$-$C_{30}$ aralkyl group; n, m, p and q are positive numbers, n+m has an average value from 1 to 100, and p+q has an average value from 0.5 to 5, and
   (B) 40 to 99% by weight of a polyoxyalkylene alkyl ether having the average compositional formula (II):

$$R^5O(C_2H_4O)_a(C_3H_6O)_b(C_2H_4O)_c(C_3H_6O)_dH$$ (II)

wherein $R^5$ is a linear, branched or cyclic $C_5$-$C_{20}$ alkyl group, a, b, c and d are 0 or positive numbers from 0 to 25, with the proviso that either one of a and b is not equal to 0, $0 \leq a+c \leq 50$, and $0 \leq b+d \leq 30$, said polyoxyalkylene alkyl ether having an HLB value from 8 to 18.

2. The surfactant composition of claim 1 wherein the glycidyl ether in component (A) is 2-ethylhexydyl glycidyl ether and/or lauryl glycidyl ether.

3. The surfactant composition of claim 1 wherein in formula (II), $R^5$ is a linear, branched or cyclic $C_5$-$C_{15}$ alkyl group.

4. The surfactant composition of claim 1 which, when prepared as a 0.1% by weight aqueous solution thereof, has a contact angle of up to 20 degrees after 30 seconds from droplet dispensing and a dynamic surface tension of up to 56 mN/m at both 1Hz and 10 Hz.

5. An ink formulation having compounded therein the water-soluble surfactant composition of claim 1.

6. A paper coating formulation having compounded therein the water-soluble surfactant composition of claim 1.

* * * * *